United States Patent [19]
Bettcher

[11] 3,977,315

[45] Aug. 31, 1976

[54] FOOD PRESS AND DIES

[75] Inventor: Louis A. Bettcher, Amherst, Ohio

[73] Assignee: Bettcher Industries, Inc., Birmingham, Ohio

[22] Filed: Feb. 24, 1975

[21] Appl. No.: 552,308

[52] U.S. Cl. .................... 100/232; 100/249; 100/295; 100/DIG. 10; 425/412; 425/513
[51] Int. Cl.² ........................... B30B 7/04
[58] Field of Search............ 100/218, 295, DIG. 10, 100/232, 249, 250, 251, 42; 425/412, 422, 408; 17/32; 99/349; 426/513

[56] References Cited
UNITED STATES PATENTS

| 823,703 | 6/1906 | Sharp | 100/295 X |
|---|---|---|---|
| 2,932,246 | 4/1960 | Galas | 100/232 |
| 3,327,622 | 6/1967 | Lebovitz | 100/232 |
| 3,759,170 | 9/1973 | Bettcher | 100/232 X |

Primary Examiner—Billy J. Wilhite
Attorney, Agent, or Firm—Watts, Hoffmann, Fisher & Heinke Co.

[57] ABSTRACT

A food press for shaping comestible products, such as meat and the like, in a tubular die aperture of uniform cross-section by a ram reciprocable in the die aperture by a cylinder and piston-type fluid actuator constructed so that no portion of the piston rod that might extend into the die aperture is retracted into the cylinder of the fluid actuator. The die aperture is formed by a channel-shaped stationary die means and a channel-shaped movable die means closed at the end opposite the ram. The movable die means has a part at the closed end which when the die means are closed extends into the channel of the stationary die means and which with the closed end of the movable die means provides an end wall or surface in the die aperture facing the ram inclined to the length of the die aperture. The face of the ram is similarly inclined so as to be parallel with the opposed wall of the die aperture.

1 Claim, 1 Drawing Figure

U.S. Patent  Aug. 31, 1976  3,977,315
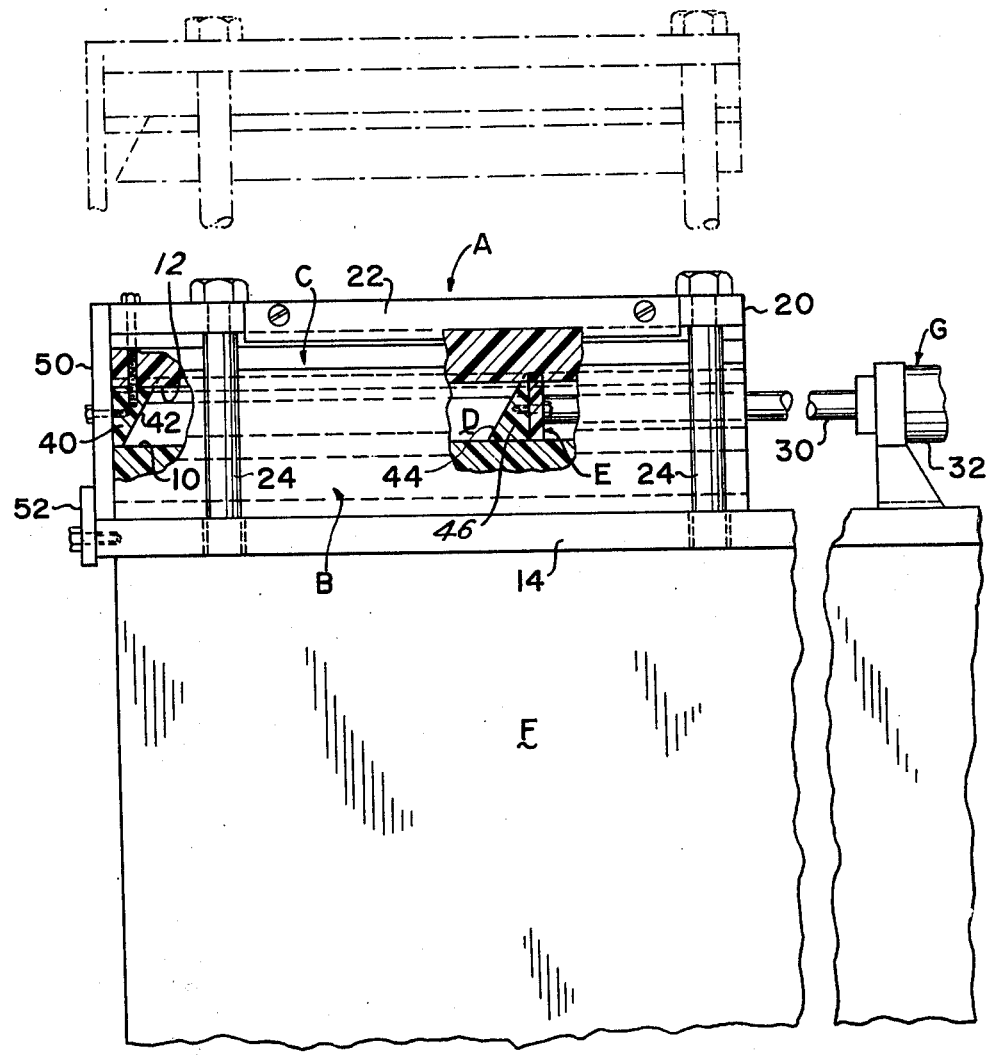

FOOD PRESS AND DIES

BACKGROUND OF THE INVENTION

1. Field of the Invention

This invention relates to apparatus for compressing and shaping comestible products.

2. Prior Art

Food products, including meat, potatoes and like products, for example, fish, poultry, ground meat, sirloins, short ribs, knuckles, etc., are often pressed into blocks or loaves of desired density and shape, typically while frozen or semi-frozen, for subsequent processing, such as, slicing into pieces of generally uniform size, shape and weight. Presses for this purpose have utilized relatively movable opposed die members which when closed form a tubular aperture closed at one end and within which the product is compressed by a ram reciprocable in the other end of the tubular aperture. In such prior art devices, however, the closed end of the tubular aperture and the side of the ram facing the closed end were planar surfaces at right angles to the length of the die aperture and in turn the path of movement of the ram with the result that the ends of the compressed product, sometimes referred to as blocks or loaves, were square, that is, normal to the length of the block or loaf.

SUMMARY OF THE INVENTION

The present invention provides a novel and improved food press, particularly adapted for the pressing of comestible products, into predetermined form, by a ram reciprocable in one end of a tubular aperture of uniform cross-sectional shape formed by two closed die members one of which has a part closing the end of the aperture remote from the ram and wherein the closed end of the aperture and the end of the ram facing the closed end are parallel and inclined with respect to the length of the aperture to form an elongated pressed article of uniform cross-sectional shape having ends inclined to its length suitable for slicing without waste into parts or articles having a size when viewed in plan larger than the cross-section of the article being sliced normal to the length thereof.

The invention will be better understood and further advantages, as well as objects, thereof will become apparent from the accompanying drawing and the ensuing description of the preferred embodiments of the invention.

BRIEF DESCRIPTION OF THE DRAWING

The single FIGURE is a front side elevation with portions broken away and portions in section of a food press embodying the present invention.

DESCRIPTION OF PREFERRED EMBODIMENT

The preferred apparatus is a food press, designated generally as A, comprising two dies or die means, B,C, the latter of which is movable toward and from the other by suitable means preferably toggle linkage mechanism, such as that shown in U.S. Pat. No. 3,759,170, which assures predetermined travel of the die means or members toward and from one another. The dies B,C have suitable die cavities 10,12 in the sides thereof facing one another and which when the dies are closed form a tubular die aperture D of uniform cross-section within which the product being processed is compressed by a reciprocating ram E. All of the operating mechanism of the press is carried by a plate 14 detachably connected to and closing a frame or base which is in the form of a cabinet F enclosing the operating mechanism of the press. The plate 14 and the operating mechanism can be readily removed as a unit from the cabinet to facilitate maintenance, etc. of the press.

The die or die means B has an elongated aperture or channel-like opening in its upper side the bottom portion of which opening provides a die cavity 10 of uniform cross-sectional shape having its left-hand end open, as viewed in the drawing. The cavity 10 is in the bottom of the channel-shaped aperture in the die B and terminates at the vertical, planar, lateral sides of the channel aperture facing one another. The die B is detachably secured to the outer upper side of the plate 14 of the press proper.

The die or die means C is detachably connected to the underside of a movable plate or platen 20 facing the outer upper side of the plate 14 as by clamp members 22. The die C has a die cavity 12 in its side opposite the side connected in the platen 20. The cavity 12 is of uniform cross-sectional shape from end to end and its peripheral side edges extend essentially to or terminating at the lateral sides of the die. The rear side of the stationary die B extends vertically to a position higher than the lower end of the rear side of the movable die C when the dies are closed and the front side of the movable die C extends farther in a downwardly direction than the rear side thereof.

The platen 20 is connected to the ends of four rods or drawbars 24 projecting outwardly from the cabinet F through suitable apertures in the plate 14. The other or lower ends of the drawbars 24 are connected to a platen located within the cabinet or housing F and adapted to be reciprocated towards and from the plate 14 to open and close the dies by suitable means, preferably toggle linkage mechanism similar to that shown in U.S. Pat. No. 3,759,170, the disclosure of which is incorporated herein by reference.

The aperture or cavity D formed by the dies or die members B,C when the press is closed, preferably is irregular in transverse cross-sectional shape, has a major and a minor dimension with the major dimension inclined to the direction of movement of the movable die, and may be similar to that of a commercially available meat product, for example, a slab of bacon, a ham, or a loin. The recesses or die cavities 10 and 12 in the respective dies blend with the adjacent side walls of the dies, have opposed relatively flat bottom portions inclined to the direction of the relative movement between the dies, and are oriented such that the long transverse dimension is askew or inclined to the path of relative movement between the dies. The construction is such that the forces applied to a product being compressed transversely of the direction of relative movement between the dies upon the closing of the press is greater than would otherwise be the case. The side clearance between the stationary and movable dies B,C, is preferably very small, only sufficient to provide an adequate path for escaped air and the like, but not large enough to allow product being compressed to be forced therethrough.

The ram E, as previously mentioned, conforms to the aperture D between the die when the press is closed and is adapted to be reciprocated in the aperture D by a reciprocating-type, double acting hydraulic actuator G including a piston rod 30 projecting from a cylinder assembly 32 through a suitable packing gland at or adjacent to the left-hand end of the cylinder assembly, as viewed in the drawings. The ram E is connected to the projecting end of the piston rod 30. The cylinder assembly 32 is supported by suitable brackets on the outer side of the plate 14 and is located at the right-hand side of the die B, a distance such that no portion of the piston rod 30 which is retracted into the cylinder assembly 32 ever moves into the cavity D thereby avoiding possible contamination of products being compressed by contaminants, such as oil, adhering to the piston rod incident to its movement into and out of the aperture D. The stroke of the actuator G and the distance of the cylinder assembly 32 from the dies B,C is preferably not less than the length of the die apertures D, and such that the ram G can be used to eject a compressed product through the left-hand end of the lower die, if desired.

For the purpose of closing the right-hand ends of the die aperture D when the press is closed, the left-hand end of the die member C includes a part 40 adjacent to its left-hand end which closes the left-hand end of the cavity 12 therein and the left-hand end of the cavity 10 in the die member B when the press is closed. The side 42 of the part 40 of the movable die C and the side 44 of the ram E facing one another are parallel to one another and inclined, preferably at an angle or angles of about 15° to 45° to the longitudinal axis of the die aperture D. The cavity 10 in the die member B opens into the left-hand end of the die so that the press is open. The portion of the die C which extends into the cavity 10 and closes the left-hand end thereof is of a cross-sectional shape transversely of the length of the die aperture D to conform to that of the cavity 10.

In the preferred embodiment shown the part 40 of the die C which closes the die cavity 12 therein and the die cavity in the die B when the press is closed is a separate member detachably connected to the main part of the die C in the die cavity 12 thereof and the inclined forward or left-hand end wall 44 of the ram E is also on a separate member 46 detachably connected to the front or left-hand end of the ram proper. In the embodiment shown a vertical plate-like member 50 connected to the left-hand end of the platen 20 and/or the die C is employed to reinforce or back up the part 40 of the die C. The part 40 may be connected to the plate 50, as desired. The lower end of the plate 50 extends to a location below the die C such that when the dies are closed the left-hand side of the lower end of the plate engages and abuts adjacent the right-hand side of a member 52 connected to the plate 14 and extending upwardly therefrom but not sufficiently for it to obstruct, when the press is open, the left-hand normally open end of the channel and/or die cavity 10 in the die B. With the construction shown one or both of the parts 40,46 can be removed and the press used to produce products or articles having one or both ends in a plane or planes at right angles to the length of the article.

The present invention also contemplates the provision of parts similar to the parts 40,46 for attachment to dies and/or rams of known presses to connect them to presses of the present invention.

When a product is pressed or compressed in the press of the present invention the resultant article or block has a predetermined cross-section in a plane or planes parallel with the ends thereof greater than the cross-section of the article or block normal, that is, at right angles to its length.

As viewed in the drawing the planar surfaces 40,44 which are inclined with respect to the axis of the aperture D are normal to the plane of the drawing but it is to be understood that they may take any axial angular orientation relative to the length of the aperture D. The surface 42, for example, may slope from front to back, or vice versa, rather than downwardly and outwardly as shown. The limiting factor insofar as the angular orientation of the inclined surfaces is the ability to open the press without distorting the workbody. Regardless of their angular orientation relative to the length of the aperture D the inclined surfaces are maintained parallel with one another.

The press A, illustrated, is a vertical-type press with the movable die traveling linearly in a vertical direction. It is to be understood, however, that the movable die may be moved in an arcuate path. The right-hand end of the movable die, or more preferably an extension thereof, for example, could be pivoted near the right-hand end of the press and the left-hand end oscillated about the connection by the hydraulic actuator, etc. Alternatively, the dies could be rotated 90° about their longitudinal axis and the movable die either reciprocated or oscillated in a horizontal path rather than a vertical path. As a further suggested alternative construction, the dies shown can be made of one or more parts, as desired.

The ram E shown is rather short referring to its direction of movement in the die cavity but may be of any suitable length and if desired, might be as long or longer than the stroke of the cylinder assembly G. If the ram E has substantial length the right-hand end of the die cavities 10, 12 may be open to permit its reciprocation therethrough. The ram E is preferably made of a non-toxic and/or edible plastic, as are the dies B,C, and the parts 40,44. The use of a plastic, such a Nylon, for the dies and ram is particularly advantageous as it is nonporous, will not absorb bacteria, is highly resistant to acids and alkalines, has a clean appearance, becomes whiter with age, is light in weight, can be easily cleaned and is a poor conductor of heat which is advantageous in a press used to reform frozen products. Nylon being slightly elastic is particularly advantageous when used as ram material because the manufacturing tolerances are less than with metal and the leading peripheral parts flex acting as a wiper seal thus preventing extrusion or leakage of product around the ram, etc.

From the foregoing it will be apparent that the objects and advantages heretofore enumerated have been accomplished and that there has been provided a novel and improved press of the character described for compressing comestible products which is simple in construction, reliable in operation, and which will produce an article preferably a comestible product or block of predetermined shape and density suitable for cutting into thin slices, which when viewed in plan have a greater cross-section size than the cross-section size of the block taken, or as viewed, in a plane at right angles to its length.

While the preferred embodiment of the invention has been described in considerable detail, it is to be understood that the invention is not limited to the particular construction shown and referred to and it is the intention to hereby cover all adaptations and modifications thereof which come within the practice of those skilled in the art to which the invention relates and the scope of the appended claims.

I claim:

1. In a press for shaping comestible products, such as meat or the like having a stationary die support, a first die member connected to said stationary support and having in one side thereof an elongated cavity of uniform cross-sectional shape open at one end, a movable die support, a second die member connected to said movable die support and having a second elongated cavity of uniform cross-sectional shape in the side thereof opposite to said one side of said first die member, mechanism for moving said movable die support to and from a position adjacent to said stationary die support to close said die members and cause said cavities in said die members to form a tubular aperture of uniform cross-sectional shape, a ram in the end of said cavity in said first die member and conforming to the cross-sectional shape of said aperture formed by said first and second die members when closed, and mechanism for reciprocating said ram: a first member detachably connected to said second die member having a side inclined to the length of said aperture closing the end of the cavity in said second die member spaced from said ram and when said first and second die members are closed closing said open one end of said cavity in said first die member; a second member detachably connected to said ram and having a side facing said first member parallel to the inclined side of said first member.

* * * * *